United States Patent
Tseng et al.

(10) Patent No.: US 9,927,811 B1
(45) Date of Patent: Mar. 27, 2018

(54) CONTROL SYSTEM AND METHOD FOR CONTROLLING MOBILE WARNING TRIANGLE

(71) Applicant: HONGFUJIN PRECISION ELECTRONICS (TIANJIN) CO., LTD., Tianjin (CN)

(72) Inventors: Shih-Yin Tseng, New Taipei (TW); Yu-Wen Chen, New Taipei (TW); Kuang-Yu Liu, New Taipei (TW); Po-Hsiang Chen, New Taipei (TW)

(73) Assignee: HONGFUJIN PRECISION ELECTRONICS (TIANJIN) C, Tianjin (CN)

( * ) Notice: Subject to any disclaimer, the term of this patent is extended or adjusted under 35 U.S.C. 154(b) by 0 days.

(21) Appl. No.: 15/652,713

(22) Filed: Jul. 18, 2017

(30) Foreign Application Priority Data

Jun. 16, 2017 (CN) .......................... 2017 1 0455855

(51) Int. Cl.
*G05D 1/00* (2006.01)
*G05D 1/02* (2006.01)
*B60R 1/00* (2006.01)
*G09F 21/00* (2006.01)

(52) U.S. Cl.
CPC ............. *G05D 1/0088* (2013.01); *B60R 1/00* (2013.01); *G05D 1/0212* (2013.01); *G05D 1/0251* (2013.01); *B60R 2300/10* (2013.01); *B60R 2300/105* (2013.01); *B60R 2300/30* (2013.01); *G09F 21/00* (2013.01)

(58) Field of Classification Search
CPC .. G05D 1/0088; G05D 1/0251; G05D 1/0212; B60R 1/00; B60R 2300/105; B60R 2300/30; B60R 2300/10; G09F 21/00
See application file for complete search history.

(56) References Cited

U.S. PATENT DOCUMENTS

| 3,759,214 | A | * | 9/1973 | Evans | .................... B60Q 7/005 |
| | | | | | 116/63 P |
| 3,933,119 | A | * | 1/1976 | Hedgewick | ............ B60Q 7/005 |
| | | | | | 116/63 P |
| 4,403,565 | A | * | 9/1983 | Bleiweiss | ............... B60Q 7/005 |
| | | | | | 116/63 P |
| 4,952,910 | A | * | 8/1990 | Straten | ..................... B60Q 7/00 |
| | | | | | 340/473 |

(Continued)

*Primary Examiner* — Russell Frejd
(74) *Attorney, Agent, or Firm* — ScienBiziP, P.C.

(57) ABSTRACT

A system for controlling a traffic warning triangle to avoid obstacles when moving towards a placement location includes a depth calculating module, a determining module, and a control module. The traffic warning triangle includes a binocular camera to capture real-time images of a path or road in front of the triangle. The depth calculating module compares and analyzes first and second images, captured at the same time, to calculate depth information between the binocular camera and an obstacle. The determining module determines whether the depth information is less than a threshold value. The control module adjusts a moving direction of the mobile warning triangle to avoid the obstacle in response to the depth information being less than the threshold value, according to a process. An obstacle avoidance method of the mobile warning triangle is also provided.

20 Claims, 5 Drawing Sheets

(56) References Cited

U.S. PATENT DOCUMENTS

| | | | | |
|---|---|---|---|---|
| 5,195,264 | A | * | 3/1993 | Johanson ................ B60Q 1/50 248/911 |
| 5,349,346 | A | * | 9/1994 | Wu .......................... B60Q 7/00 116/63 T |
| 7,142,103 | B2 | * | 11/2006 | Chen ........................ B60Q 7/00 340/471 |
| 8,742,917 | B2 | * | 6/2014 | Ho ........................... B60Q 7/00 116/63 P |
| 9,235,210 | B2 | * | 1/2016 | Zhang ..................... G09F 13/16 |
| 2003/0090392 | A1 | * | 5/2003 | Schuessler ............ G08G 1/0965 340/988 |
| 2007/0189028 | A1 | * | 8/2007 | Chen ........................ B60Q 7/00 362/545 |

* cited by examiner

CONTROL SYSTEM AND METHOD FOR CONTROLLING MOBILE WARNING TRIANGLE

FIELD

The subject matter herein generally relates to road traffic safety.

BACKGROUND

A warning triangle raised at a distance from a broken-down car can warn other vehicles to slow down or change lanes. A current mobile warning triangle cannot avoid an obstacle when moving.

BRIEF DESCRIPTION OF THE DRAWINGS

Implementations of the present technology will now be described, by way of example only, with reference to the attached figures.

DETAILED DESCRIPTION

Figure 1:
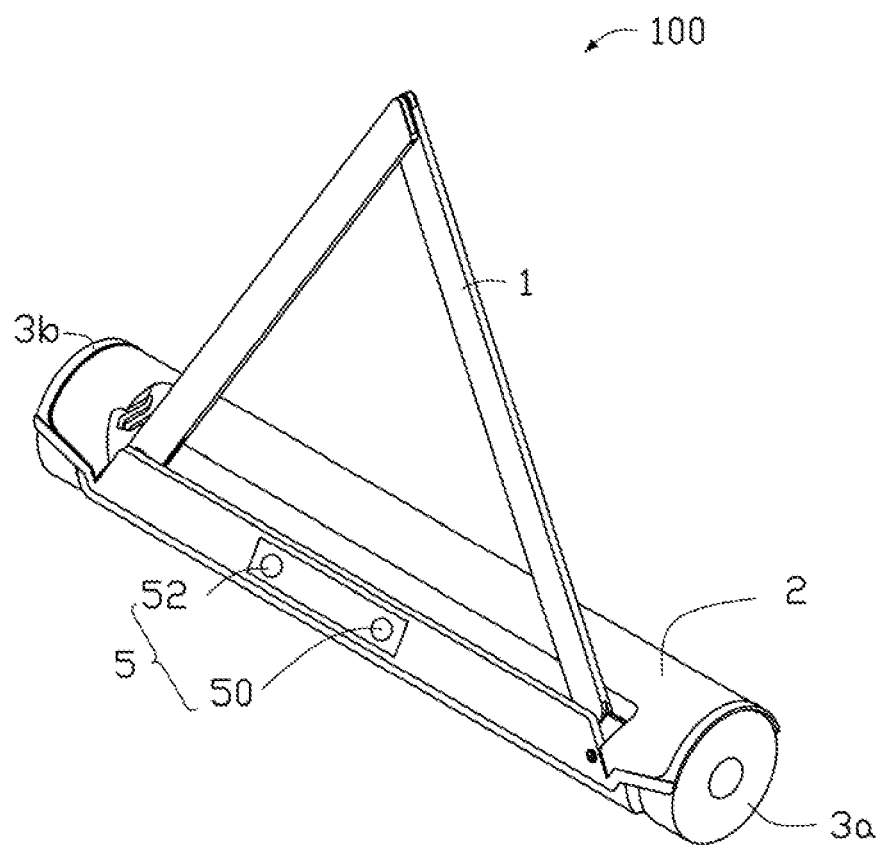
FIG. 1 is a diagram of an exemplary embodiment of a mobile warning triangle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a mobile warning triangle 100 in accordance with an exemplary embodiment.

The mobile warning triangle 100 comprises a warning triangle 1, a base 2, at least two wheels, a control system 4 (shown in FIG. 2), and a binocular camera 5. The at least two wheels in this exemplary embodiment comprise two wheels 3a and 3b. The two wheels 3a and 3b are installed on two sides of the base 2. The control system 4 drives the mobile warning triangle 100 to move.

In one exemplary embodiment, the binocular camera 5 can be installed on the base 2. The binocular camera 5 can comprise a left camera 50 and a right camera 52.

The mobile warning triangle 100 is raised at a first predetermined distance from a stationary car or other road impediment to warn other vehicles to slow down or change lanes. The first predetermined distance can be 100 meters or 150 meters for example.

Figure 2:
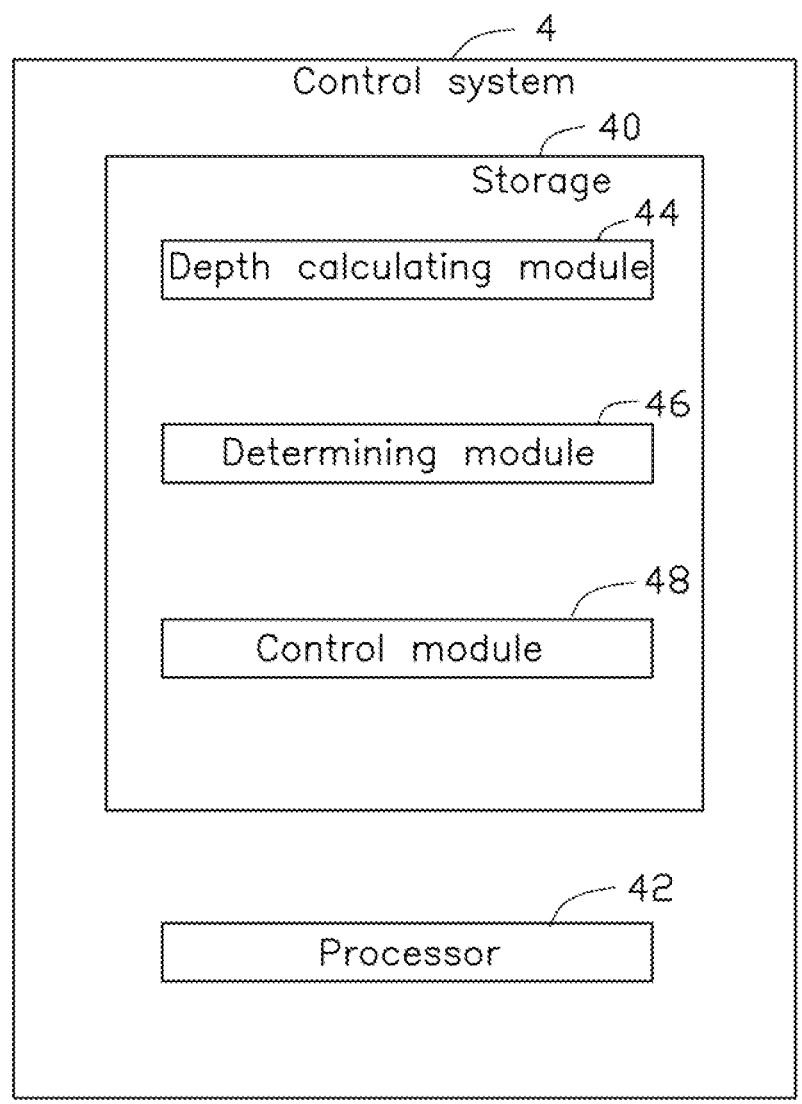
FIG. 2 is a block diagram of an exemplary embodiment of a control system of the mobile warning triangle.

Referring to FIG. 2, the control system 4 can comprise at least one storage 40 and at least one processor 42. The control system 4 can further comprises a plurality of modules, such as a depth calculating module 44, a determining module 46, and a control module 48. The modules 44-48 can comprise one or more software programs in the form of computerized codes stored in the storage 40. The computerized codes can include instructions that can be executed by the processor 42 to provide functions for the modules 44-48.

When the mobile warning triangle 100 is moving on a road, the binocular camera 5 captures real-time images of the road in front of the mobile warning triangle 100 to obtain a first image and a second image. The first image is captured by the left camera 50, the second image is captured by the right camera 52.

The depth calculating module 44 compares and analyzes the first image and the second image to calculate depth information between the binocular camera 5 and an obstacle in the path of the triangle 100.

In one exemplary embodiment, the binocular camera 5 can imitate the human eye in capturing the real-time images of the road. The depth calculating module 44 obtains parallax information between the first image and the second image, the first and second images being captured at the same time.

Figure 3:
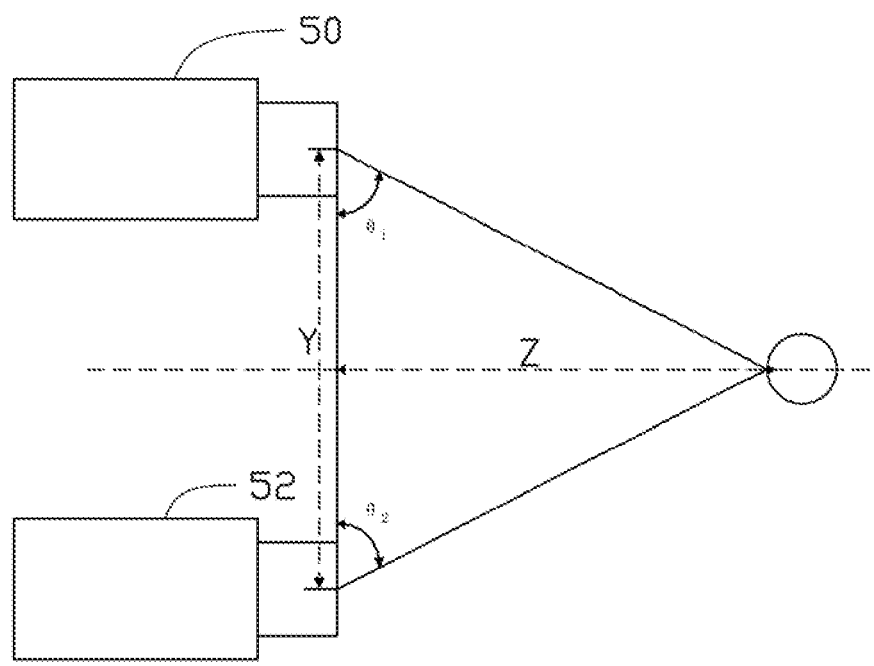
FIG. 3 is a diagram of an exemplary embodiment of calculating of a depth information through using a left camera and a right camera.

Referring to FIG. 3, the depth calculating module 44 can further obtain a first parallax angle θ1 of the left camera 50, a second parallax angle θ2 of the right camera 52, and a base length Y between the left camera 50 and the right camera 52. The depth calculating module 44 calculates the depth information (Z represents the depth information in FIG. 3) between the binocular camera 5 and the obstacle according to the first parallax angle θ1, the second parallax angle θ2, and the base length Y.

In one exemplary embodiment, the left camera 50 and the right camera 52 are on the same horizontal level. The depth calculating module 44 can compare and analyze the first image and the second image, which are captured at the same time, through an Open Source Computer Vision Library (OpenCV) algorithm.

The determining module 46 determines whether the depth information is less than a threshold value. The control module 48 adjusts a moving direction of the mobile warning triangle 100 to avoid the obstacle in response to the depth information being less than the threshold value.

For example, the threshold value is two meters. When the depth information is less than the threshold value (Z<2m), it indicates that an obstacle will be an obstruction, and the mobile warning triangle 100 needs to detour around the obstacle. When the depth information is greater than the threshold value (Z>2m), no obstacle in front of the mobile warning triangle 100 is indicated, and the mobile warning triangle 100 can move straight on.

In one exemplary embodiment, the determining module 46 further determines whether a placement distance between the mobile warning triangle 100 and the car is equal to the first predetermined distance. When the placement distance is equal to the first predetermined distance, the control module 48 controls the mobile warning triangle 100 to stop.

Figure 4:
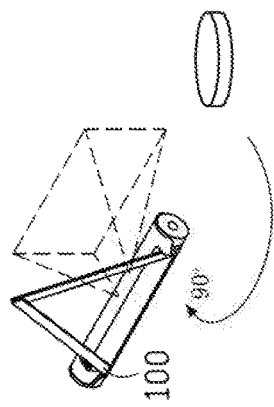
FIG. 4 is a diagram of an exemplary embodiment of the mobile warning triangle avoiding an obstacle.
Figure 4:
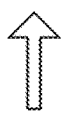
Figure 4:
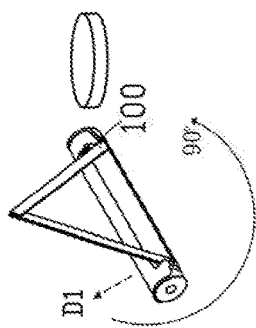
Figure 4:
Figure 4:
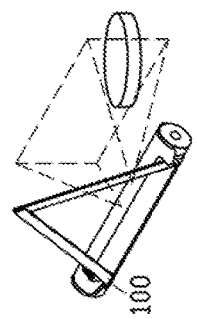

Referring to FIG. 4, when the determining module 46 determines that the depth information is less than the threshold value, the control module 48 adjusts a moving direction of the mobile warning triangle 100 to avoid the obstacle. First, the control module 48 controls the mobile warning triangle 100 to rotate 90 degrees counterclockwise to turn left as a detour. Second, the control module 48 controls the mobile warning triangle 100 to move left a second predetermined distance D1. Third, the control module 48 controls the mobile warning triangle 100 to turn back towards the initial direction to move straight on after the mobile warning triangle 100 has moved the second predetermined distance D1.

The depth calculating module 44 recalculates depth information between the binocular camera and any obstacle, and the determining module 46 determines whether a recalculated depth information is less than the threshold value. When the recalculated depth information is less than the threshold value, the control module 48 repeats the step of controlling the mobile warning triangle 100 to turn left to avoid the obstacle. When the recalculated depth information is greater than the threshold value, the mobile warning triangle 100 has avoided the obstacle, and the control module 48 controls the mobile warning triangle 100 to move on until the placement distance has been reached.

In one exemplary embodiment, when the determining module 46 determines that the depth information is less than the threshold value, the control module 48 can also control the mobile warning triangle 100 to rotate 90 degrees clockwise to turn right to try to avoid the obstacle.

In one exemplary embodiment, when the recalculated depth information is less than the threshold value, the determining module 46 further determines whether a number of times of adjusting the direction of the mobile warning triangle 100 is greater than a predetermined threshold number. The predetermined threshold number can be three, for example. When the number of adjusting times is greater than three times, the control module 48 controls the mobile warning triangle 100 to stop and turn back to the initial direction.

In one exemplary embodiment, when the recalculated depth information is less than the threshold value and the number of adjusting times is greater than three times, the control module 48 controls the mobile warning triangle 100 to turn to an opposite side to retry directions no more than three times to avoid the obstacle.

For example, when the mobile warning triangle 100 moves to a location A1 and the determining module 46 determines that the depth information is less than the threshold value, the control module 48 controls the mobile warning triangle 100 to rotate 90 degrees clockwise to turn right to try to avoid the obstacle. When the recalculated depth information is less than the threshold value and the number of adjusting times is greater than three times, the control module 48 controls the mobile warning triangle 100 to go back to the location A1 and controls the mobile warning triangle 100 to turn left to retry to avoid the obstacle. When the number of retrying times is greater than three times, the control module 48 controls the mobile warning triangle 100 to stop and turn back to the initial direction.

In one exemplary embodiment, the mobile warning triangle 100 can obtain directional information and angle information respectively through a GPS unit and an acceleration sensor.

Figure 5:
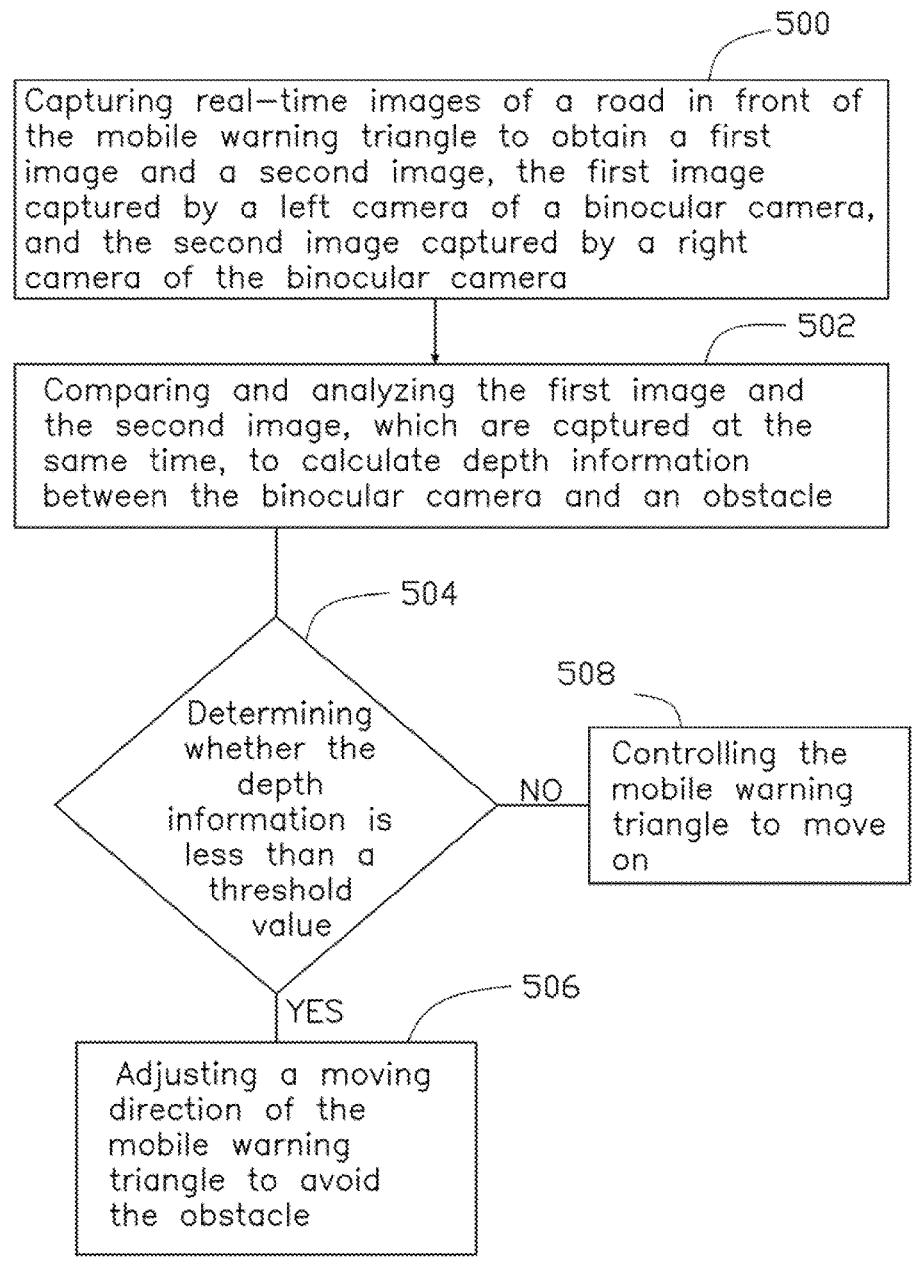
FIG. 5 is a flow diagram of an exemplary embodiment of an obstacle avoidance method of the mobile warning triangle.

FIG. 5 illustrates one exemplary embodiment of a obstacle avoidance method of the mobile warning triangle 100. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each step shown in FIG. 5 may represent one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step 500.

In step 500, the binocular camera 5 captures real-time images of a road in front of the mobile warning triangle 100 to obtain a first image and a second image. The first image is captured by the left camera 50, the second image is captured by the right camera 52.

In step 502, the depth calculating module 44 compares and analyzes the first image and the second image, which are captured at the same time, to calculate depth information between the binocular camera 5 and an obstacle.

In step 504, the determining module 46 determines whether the depth information is less than a threshold value.

In step 506, if the depth information is less than the threshold value, the control module 48 adjusts a moving direction of the mobile warning triangle 100 to avoid the obstacle.

In step 508, if the depth information is greater than the threshold value, the control module 48 controls the mobile warning triangle 100 to move on.

In one exemplary embodiment, the depth calculating module 44 obtains parallax information between the first image and the second image to obtain the first parallax angle $\theta 1$, the second parallax angle $\theta 2$, and the base length Y between the left camera 50 and the right camera 52. The depth calculating module 44 calculates the depth information between the binocular camera 5 and the obstacle according to the first parallax angle $\theta 1$, the second parallax angle $\theta 2$, and the base length Y.

In one exemplary embodiment, the left camera 50 and the right camera 52 are on the same horizontal level. The depth calculating module 44 can compare and analyze the first image and the second image, which are captured at the same time, through an OpenCV algorithm.

In one exemplary embodiment, the determining module 46 further determines whether a placement distance between the mobile warning triangle 100 and the car is equal to the first predetermined distance. When the placement distance is equal to the first predetermined distance, the control module 48 controls the mobile warning triangle 100 to stop.

In one exemplary embodiment, when the determining module 46 determines that the depth information is less than the threshold value, the control module 48 adjusts a moving direction of the mobile warning triangle 100 to avoid the obstacle. First, the control module 48 controls the mobile warning triangle 100 to rotate 90 degrees counterclockwise to turn left as a detour. Second, the control module 48 controls the mobile warning triangle 100 to move left the second predetermined distance D1. Third, the control module 48 controls the mobile warning triangle 100 to turn back towards the initial direction to move straight on after the mobile warning triangle 100 has moved the second predetermined distance D1.

In one exemplary embodiment, the depth calculating module 44 recalculates depth information between the binocular camera and any obstacle, and the determining module 46 determines whether a recalculated depth information is then less than the threshold value. When the recalculated depth information is less than the threshold value, the control module 48 repeats the step of controlling the mobile warning triangle 100 to turn left to avoid the obstacle. When the recalculated depth information is greater than the threshold value, the mobile warning triangle 100 has avoided the obstacle, and the control module 48 controls the mobile warning triangle 100 to move on until the placement distance has been reached.

In one exemplary embodiment, when the determining module 46 determines that the depth information is less than the threshold value, the control module 48 can also control the mobile warning triangle 100 to rotate 90 degrees clockwise to turn right to try to avoid the obstacle.

In one exemplary embodiment, when the recalculated depth information is less than the threshold value, the determining module 46 further determines whether a number of times of adjusting the direction of the mobile warning triangle 100 is greater than a predetermined threshold number. The predetermined threshold number can be three times for example. When the number of adjusting times is greater than three times, the control module 48 controls the mobile warning triangle 100 to stop and turn back to the initial direction.

In one exemplary embodiment, when the recalculated depth information is less than the threshold value and the number of adjusting times is greater than three times, the control module 48 controls the mobile warning triangle 100 to turn to an opposite side to retry directions no more than three times to avoid the obstacle.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An obstacle avoidance method of a mobile warning triangle, the obstacle avoidance method comprising:
    capturing real-time images of a road in front of the mobile warning triangle to obtain a first image and a second image, the first image captured by a left camera of a binocular camera, and the second image captured by a right camera of the binocular camera;
    comparing and analyzing the first image and the second image, which are captured at the same time, to calculate depth information between the binocular camera and an obstacle;
    determining whether the depth information is less than a threshold value; and
    adjusting a moving direction of the mobile warning triangle to avoid the obstacle in response to the depth information being less than the threshold value.

2. The obstacle avoidance method of claim 1, further comprising:
    controlling the mobile warning triangle to move on in response to the depth information being greater than the threshold value.

3. The obstacle avoidance method of claim 2, further comprising:
    determining whether a placement distance of the mobile warning triangle is equal to a first predetermined distance; and
    controlling the mobile warning triangle to stop in response to the placement distance of the mobile warning triangle being equal to the first predetermined distance.

4. The obstacle avoidance method of claim 1, wherein the left camera and the right camera are on the same horizontal level.

5. The obstacle avoidance method of claim 1, wherein the step of calculating the depth information between the binocular camera and the obstacle comprises:
    obtaining parallax information between the first image and the second image, which are captured at the same time;
    obtaining a first parallax angle of the left camera, a second parallax angle of the right camera, and a base length between the left camera and the right camera according to the parallax information; and
    calculating the depth information between the binocular camera and the obstacle according to the first parallax angle, the second parallax angle, and the base length.

6. The obstacle avoidance method of claim 1, wherein the step of adjusting the moving direction of the mobile warning triangle to avoid the obstacle in response to the depth information being less than the threshold value comprises:
    controlling the mobile warning triangle to turn left or to turn right as a detour and moving a second predetermined distance in response to the depth information being less than the threshold value;
    controlling the mobile warning triangle to turn back to toward the initial direction after the mobile warning triangle has moved the second predetermined distance;
    recalculating depth information between the binocular camera and any obstacle and determining whether a recalculated depth information is less than the threshold value; and
    repeating the step of controlling the mobile warning triangle to turn left or turn right in response to the recalculated depth information being less than the threshold value.

7. The obstacle avoidance method of claim 6, further comprising:
    determining whether a number of adjusting times of the mobile warning triangle is greater than a predetermined threshold number in response to the recalculated depth information being less than the threshold value; and
    controlling the mobile warning triangle to stop and turn back to toward the initial direction in response to the number of adjusting times being greater than the predetermined threshold number.

8. The obstacle avoidance method of claim 6, further comprising:
    determining whether a number of adjusting times of the mobile warning triangle is greater than a predetermined threshold number in response to the recalculated depth information being less than the threshold value; and controlling the mobile warning triangle to turn to an opposite side to retry directions no more than the predetermined threshold number to avoid the obstacle.

9. A mobile warning triangle comprising:
a warning triangle;
a base;
at least two wheels installed on two sides of the base;
a binocular camera capturing real-time images of a road in front of the mobile warning triangle to obtain a first image and a second image; and
a control system comprising:
  at least one storage configured to store a plurality of modules, the plurality of modules being a collection of instructions of an application operable in the system;
  at least one processor configured to execute the plurality of modules, the modules comprising:
    a depth calculating module comparing and analyzing the first image and the second image, which are captured at the same time, to calculate depth information between the binocular camera and an obstacle;
    a determining module determining whether the depth information is less than a threshold value; and
    a control module adjusting a moving direction of the mobile warning triangle to avoid the obstacle in response to the depth information being less than the threshold value;
    wherein the first image is captured by a left camera of the binocular camera, and the second image is captured by a right camera of the binocular camera.

10. The mobile warning triangle of claim 9, wherein the control module further controls the mobile warning triangle to move on in response to the depth information being greater than the threshold value.

11. The mobile warning triangle of claim 10, wherein the determining module further determines whether a placement distance of the mobile warning triangle is equal to a first predetermined distance, and the control module controls the mobile warning triangle to stop in response to the placement distance of the mobile warning triangle being equal to the first predetermined distance.

12. The mobile warning triangle of claim 9, wherein the depth calculating module obtains parallax information between the first image and the second image, which are captured at the same time, and further obtains a first parallax angle of the left camera, a second parallax angle of the right camera, and a base length between the left camera and the right camera according to the parallax information, the depth calculating module further calculates the depth information between the binocular camera and the obstacle according to the first parallax angle, the second parallax angle, and the base length.

13. The mobile warning triangle of claim 9, wherein when the depth information is less than the threshold value, the control module controls the mobile warning triangle to turn left or to turn right as a detour and moves a second predetermined distance, the control module further controls the mobile warning triangle to turn back to toward the initial direction after the mobile warning triangle has moved the second predetermined distance; the depth calculating module recalculates depth information between the binocular camera and any obstacle; the determining module determines whether a recalculated depth information is less than the threshold value; and the control module repeats the step of controlling the mobile warning triangle to turn left or turn right in response to the recalculated depth information being less than the threshold value.

14. The mobile warning triangle of claim 13, wherein when the recalculated depth information is less than the threshold value, the determining module determines whether a number of adjusting times of the mobile warning triangle is greater than a predetermined threshold number; and the control module controls the mobile warning triangle to stop and turn back to toward the initial direction in response to the number of adjusting times being greater than the predetermined threshold number.

15. The mobile warning triangle of claim 13, wherein when the recalculated depth information is less than the threshold value, the determining module determines whether a number of adjusting times of the mobile warning triangle is greater than a predetermined threshold number; and the control module controls the mobile warning triangle to turn to an opposite side to retry directions no more than the predetermined threshold number to avoid the obstacle.

16. A control system of a mobile warning triangle, the control system comprising:
at least one storage configured to store a plurality of modules, the plurality of modules being a collection of instructions of an application operable in the system;
at least one processor configured to execute the plurality of modules, the modules comprising:
  a depth calculating module comparing and analyzing a first image and a second image, which are captured by a binocular camera of the mobile warning triangle at the same time, to calculate depth information between the binocular camera and an obstacle;
  a determining module determining whether the depth information is less than a threshold value; and
  a control module adjusting a moving direction of the mobile warning triangle to avoid the obstacle in response to the depth information being less than the threshold value;
  wherein the first image is captured by a left camera of the binocular camera, and the second image is captured by a right camera of the binocular camera.

17. The control system of claim 16, wherein the control module further controls the mobile warning triangle to move on in response to the depth information being greater than the threshold value; the determining module further determines whether a placement distance of the mobile warning triangle is equal to a first predetermined distance; and the control module controls the mobile warning triangle to stop in response to the placement distance of the mobile warning triangle being equal to the first predetermined distance.

18. The control system of claim 16, wherein when the depth information is less than the threshold value, the control module controls the mobile warning triangle to turn left or to turn right as a detour and moves a second predetermined distance, the control module further controls the mobile warning triangle to turn back to toward the initial direction after the mobile warning triangle moves the second predetermined distance; the depth calculating module recalculates depth information between the binocular camera and any obstacle; the determining module determines whether a recalculated depth information is less than the threshold value; and the control module repeats the step of controlling the mobile warning triangle to turn left or turn right in response to the recalculated depth information being less than the threshold value.

19. The control system of claim 18, wherein when the recalculated depth information is less than the threshold value, the determining module determines whether a number of adjusting times of the mobile warning triangle is greater than a predetermined threshold number; and the control module controls the mobile warning triangle to stop and turn back to toward the initial direction in response to the number of adjusting times being greater than the predetermined threshold number.

20. The control system of claim 18, wherein when the recalculated depth information is less than the threshold value, the determining module determines whether a number of adjusting times of the mobile warning triangle is greater than a predetermined threshold number; the control module controls the mobile warning triangle to turn to an opposite side to retry directions no more than the predetermined threshold number to avoid the obstacle.

* * * * *